US011943230B2

(12) United States Patent
Vuggrala et al.

(10) Patent No.: US 11,943,230 B2
(45) Date of Patent: Mar. 26, 2024

(54) SYSTEM AND METHOD FOR DYNAMIC ORCHESTRATION OF VIRTUAL GATEWAYS BASED ON USER ROLE

(71) Applicant: HEWLETT PACKARD ENTERPRISE DEVELOPMENT LP, Houston, TX (US)

(72) Inventors: Shravan Kumar Vuggrala, Bangalore (IN); Raghunandan Prabhakar, Bangalore (IN)

(73) Assignee: Hewlett Packard Enterprise Development LP, Spring, TX (US)

( * ) Notice: Subject to any disclaimer, the term of this patent is extended or adjusted under 35 U.S.C. 154(b) by 421 days.

(21) Appl. No.: 17/333,451

(22) Filed: May 28, 2021

(65) Prior Publication Data

US 2022/0321571 A1 Oct. 6, 2022

(30) Foreign Application Priority Data

Mar. 31, 2021 (IN) .............................. 202141014917

(51) Int. Cl.
| | |
|---|---|
| *H04L 29/06* | (2006.01) |
| *G06F 16/28* | (2019.01) |
| *H04L 9/40* | (2022.01) |
| *H04L 41/0803* | (2022.01) |
| *H04L 41/0896* | (2022.01) |

(52) U.S. Cl.
CPC .......... *H04L 63/105* (2013.01); *G06F 16/285* (2019.01); *H04L 41/0803* (2013.01); *H04L 41/0896* (2013.01)

(58) Field of Classification Search
CPC ............. H04L 63/1416; H04L 41/0803; H04L 41/0896; G06F 16/285
See application file for complete search history.

(56) References Cited

U.S. PATENT DOCUMENTS

| | | | |
|---|---|---|---|
| 10,120,725 B2 | 11/2018 | Jubran et al. | |
| 10,200,213 B1 | 2/2019 | Mathews et al. | |
| 11,212,171 B1 * | 12/2021 | Ozkan | G06F 9/453 |

(Continued)

OTHER PUBLICATIONS

Amazon Web Services, Inc., "Control access to an API with IAM permissions," retrieved online Dec. 29, 2020, https://docs.aws.amazon.com/apigateway/latest/developerguide/permissions.html.

(Continued)

*Primary Examiner* — Jeffrey C Pwu
*Assistant Examiner* — Thong P Truong
(74) *Attorney, Agent, or Firm* — Slater Matsil, LLP

(57) ABSTRACT

A system and a method for configuring resources over a network cloud are described. Attributes related to user roles i.e. categories of user roles, network cloud based services associated with each category, and a number of users associated with each category are received. Hardware capabilities and/or network capabilities corresponding to the attributes are determined from a mapping table stored in a repository. A service set capable of providing the hardware capabilities and the network capabilities is determined from the mapping table stored in the repository. The mapping table is based on previous implementations and instructions associated with one or more service sets. Resources are configured over the network cloud to implement the service set.

20 Claims, 5 Drawing Sheets

(56) References Cited

U.S. PATENT DOCUMENTS

2019/0164242 A1    5/2019  Zhang et al.
2020/0136864 A1*  4/2020  McBride ............. H04L 12/2876

OTHER PUBLICATIONS

Virtuozzo, "Allocating Resources," Virtuozzo Hybrid Infrastructure 3.5 Evaluation Guide, Version 3.5.5, Jul. 21, 2020, https://docs.virtuozzo.com/virtuozzo_hybrid_infrastructure_3_5_evaluation_guide/managing-compute-cluster/allocating-resources.html.

* cited by examiner

| Input attributes | | | | | | RCE compute | |
|---|---|---|---|---|---|---|---|
| Network configuration request | Authentication | Encryption | User Count | Bandwidth requested | | Processing requirement | Storage requirement |
| ENG_ROLE_DOT1X _AES_5GBPS_1000 | WPA2-Enterprise | AES-CCM | 1000 | 5 Gbps | | 4CPU | 6GB RAM |
| ENG_ROLE_DOT1X _AES_5GBPS_10000 | WPA2-Enterprise | AES-CCM | 10000 | 5 Gbps | | 5CPU | 8GB RAM |
| ENG_ROLE_DOT1X _AES_10GBPS_1000 | WPA2-Enterprise | AES-CCM | 1000 | 10 Gbps | | 6CPU | 16GB RAM |
| GUEST_ROLE_OPEN _5GBPS_1000 | Open | NULL | 1000 | 5 Gbps | | 3CPU | 4GB RAM |
| GUEST_ROLE_OPEN _10GBPS_1000 | Open | NULL | 10000 | 10 Gbps | | 5CPU | 8GB RAM |

Fig. 4

SYSTEM AND METHOD FOR DYNAMIC ORCHESTRATION OF VIRTUAL GATEWAYS BASED ON USER ROLE

BACKGROUND

As the requirement for software and hardware computing resources are increasing rapidly, new computing platforms are evolved to meet the requirements of individuals and companies for provisioning access to computing resources as well as providing management of the computing resources in a cost effective manner. The hardware providers or vendors that operate such platforms enable customers to outsource their physical computing resource requirements while retaining a great deal of control over their use.

For instance, cloud computing platforms a.k.a cloud networks provided by different vendors offer access to physical computing resources that are hosted on remote data centers (e.g. cloud data centers). The computing resources include interconnected stacks of processors and different memories. Volatile memory such as Random Access Memory (RAM) and non-volatile memory such as Hard Disk Drives (HDDs) and flash drives may be available as the computing resources over the cloud networks. Each vendor typically offers different configurations of computing resources to provide services to their customers which includes a group of users or an organization.

BRIEF DESCRIPTION OF THE DRAWINGS

The accompanying drawings constitute a part of the description and are used to provide further understanding of the present disclosure. Such accompanying drawings illustrate the embodiments of the present disclosure which are used to describe the principles related to the present disclosure. The embodiments are illustrated by way of example and not by way of limitation in the figures of the accompanying drawings in which like references indicate similar elements. It should be noted that references to "an" or "one" embodiment in this disclosure are not necessarily to the same embodiment, and they mean at least one. In the drawings:

FIG. 4 illustrates hardware and network requirements determined for different network configuration requests, in accordance with an embodiment of the present disclosure.

DETAILED DESCRIPTION

Figure 1:
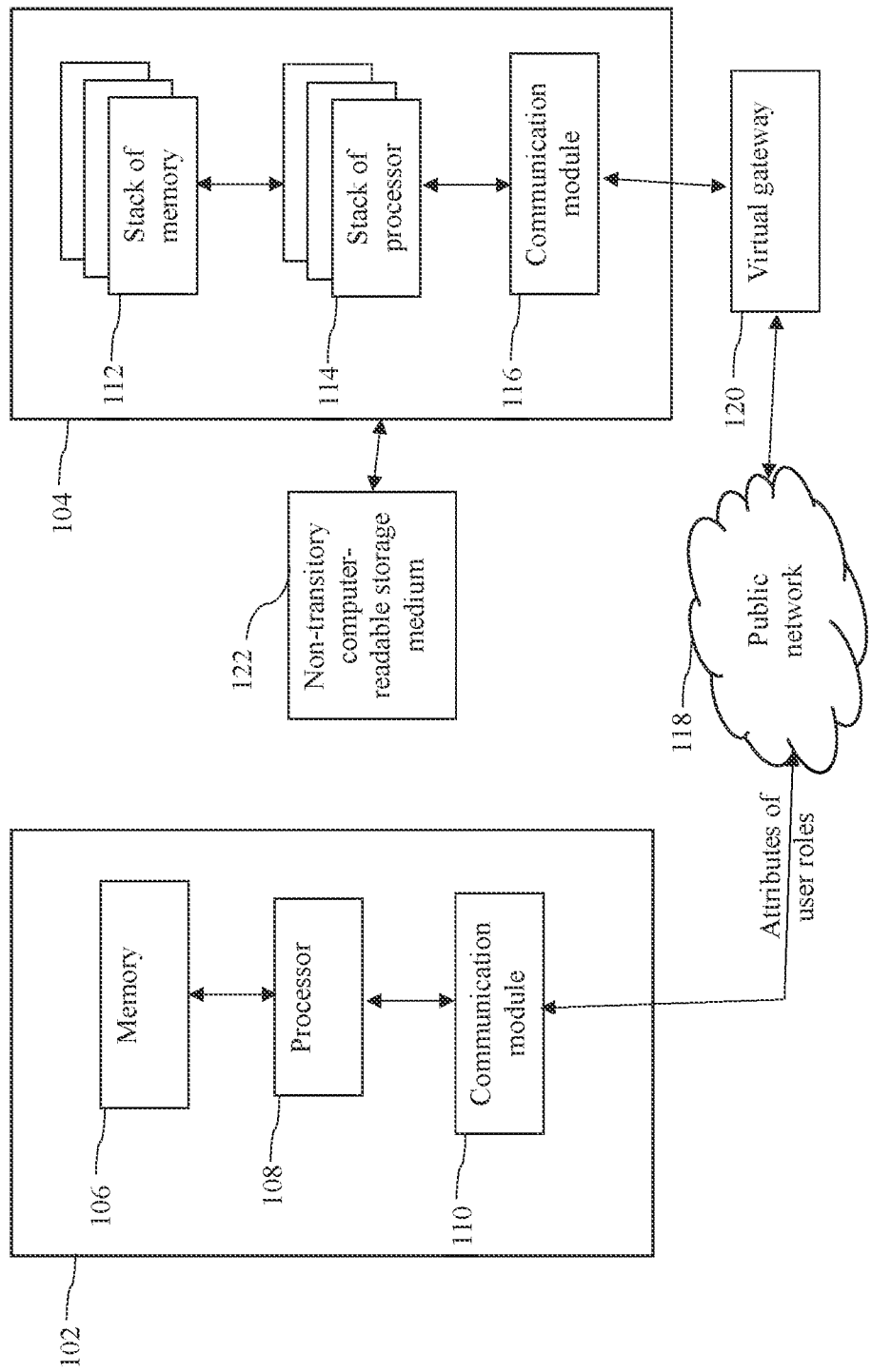
FIG. 1 illustrates a network architecture of a system for configuring resources over a cloud network, in accordance with an embodiment of the present disclosure.

Existing solutions allowing orchestration of service set or a Stock Keeping Unit (SKU) over a cloud network requires a user, specifically a network administrator, to manually select the service set. The network administrator selects the service set solely based on a number of users required to access the service set. Such approach is inefficient as all the users in an organization do not have similar hardware and network requirements or similar privilege to use hardware and network. Hardware requirements includes hardware components that are physically needed to store data and process the data, e.g. processing and storage requirements. The hardware components required to store data may include different types of data storage elements, such as optical data storage elements such as Compact Disc (CD), Digital Video Disc (DVD), Blu-Ray disc, magnetic data storage elements such as Hard Disk Drives (HDD), flash memories such as Solid State Drive (SSD), and holographic memories. The hardware components required to process data may include different types of data processing elements, such as Application Specific Integrated Circuit (ASIC). Field Programmable Gate Array (FPGA), and Digital Signal Processor (DSP). Network requirements include thresholds for data flow, e.g. bandwidth and throughput requirements. Data flow may depend on several factors including, but not limited to, type of network devices (such as network routers and network switches) used, connection topology of the network devices, and data transfer privileges configured on the network devices. For example, a group of 500 users of an engineering team may require access to sufficiently more amount of hardware or advanced hardware and network performance compared to 500 users of a finance team. An advanced hardware means a hardware having superior computing capability, such as a processor core of 3.2 GHz compared to a processor core of 2.8 GHz. This is because the users of the engineering team might be required to perform computationally expensive tasks, such as accessing and performing analytics over a vast dataset in an encrypted manner. In comparison, users of the finance team might mostly be required to raise invoices, which might be a computationally inexpensive task compared to the task performed the users of engineering team. Therefore, a service set purchased or licensed merely based on the user count might under-serve requirements of the engineering team. Further, the same service set might prove to be superfluous than the actual requirements of the finance team.

In order to address this technical problem, examples disclosed herein include a method and a system that leverages user role based licensing to dynamically orchestrate virtual gateways in cloud networks. Compute resource consumption of users on network devices like network controllers or gateways may be a function of the users' roles. For example, in an Enterprise deployment, the users having research and development roles require certain capabilities like an encryption service (WPA3, WPA2-Enterprise), and users having a guest role would just use open authentication without encryption. For such reason, the users having research and development role might require more hardware and network capabilities than the users having a guest role.

The systems and methods disclosed herein determines hardware and network capabilities corresponding to the user role and a number of users associated with the role, using a repository storing such information. Such repository may be built from learning gathered from previous implementations and instructions associated with the service sets, released by agencies managing the cloud networks. The proposed systems and methods also include determining a service set that would be sufficient to provide the identified hardware and network capabilities. Successively, such service set may be licensed over the cloud network for the users. Further, such service set may be modified during changes of users' roles and/or change in the number of users having such roles.

FIG. 1 illustrates a network architecture of a system for configuring resources over a network cloud, in accordance with an embodiment of the present disclosure. An organization's network may include a plurality of user devices operated by users associated with different roles. Further, a network administrator may operate a network administrator device 102 using which he may license a service set over a network cloud 104 to serve hardware and network requirements of the users operating their user devices within the organization. The user device may correspond to different computing devices, such as laptop, desktop, smart phones, and mobile tablets. The network administrator device 102 includes a memory 106, a processor 108, and a communication module 110. The memory 106 is configured to store program instructions generated as a result of the commands entered by the network administrator for operating the network administrator device 102. Such program instructions will be executed by the processor 108. The communication module 110 is configured to transmit commands for configuration of the service set and data (attributes related to the user roles) to the administrator device 102 and receive any response from the network cloud 104.

The network cloud 104 includes a stack of memory 112, a stack of processor 114, and a communication module 116. The service set suiting requirements of the users present in the organization's network might be licensed and configured over one or more memory of the stack of memory 112 and/or one or more processor of the stack of processor 114. The communication module 116 is configured to receive commands for configuration of the service set and the data (attributes related to the user roles) from the network administrator device 102 and transmit responses to the network administrator device 102. Communication of the commands and data between the network administrator device 102 and the network cloud 104 would occur via secure communication sessions. Such secure communication sessions may correspond to Virtual Private Network (VPN) tunnels established over a public network 118, such as internet. Further, access to the network cloud 104 may be controlled by a virtual gateway 120. Although the virtual gateway 120 is illustrated as a separate network device different from elements of the network cloud 104, the virtual gateway 120 may also be implemented over the network cloud 104. In one implementation, the virtual gateway 120 may be implemented on a networking device including a memory configured to store access control information, and a processor configured to execute commands for providing access of one or more elements of the network cloud 104, based on the access control information.

Upon gaining access to the virtual gateway 120, the network administrator may input attributes related to user roles, Such attributes may include categories of roles of the users, network cloud based services associated with each category, and a number of the users associated with each category. The network cloud based services mean hardware and/or software services hosted over the network cloud 104 and may belong to one of several categories of services including Infrastructure as a Service (IaaS), Platform as a Service (PaaS), Software as a Service (SaaS), Enterprise Resource Planning (ERP), and managed services. Based on such attributes, the virtual gateway 120 may determine required hardware and network capabilities, using a repository storing such information. Thereupon, the virtual gateway 120 may determine a service set that would be sufficient to provide the identified hardware and/or network capabilities. Successively, such service set may be licensed over the cloud network for the users. In some examples, the service set may be represented by Stock-Keeping Units (SKUs) where each SKU represents a different service set. A non-transitory computer-readable storage medium 122 may be used to store program instructions responsible for providing User Interface (UI) on the network administrator device 102 for entering inputs (attributes) and viewing output results, for establishing communication between the network administrator device 102 and the network cloud 104, and for managing operations over the network cloud 104 for implementing and enabling functioning of service sets.

Figure 2:
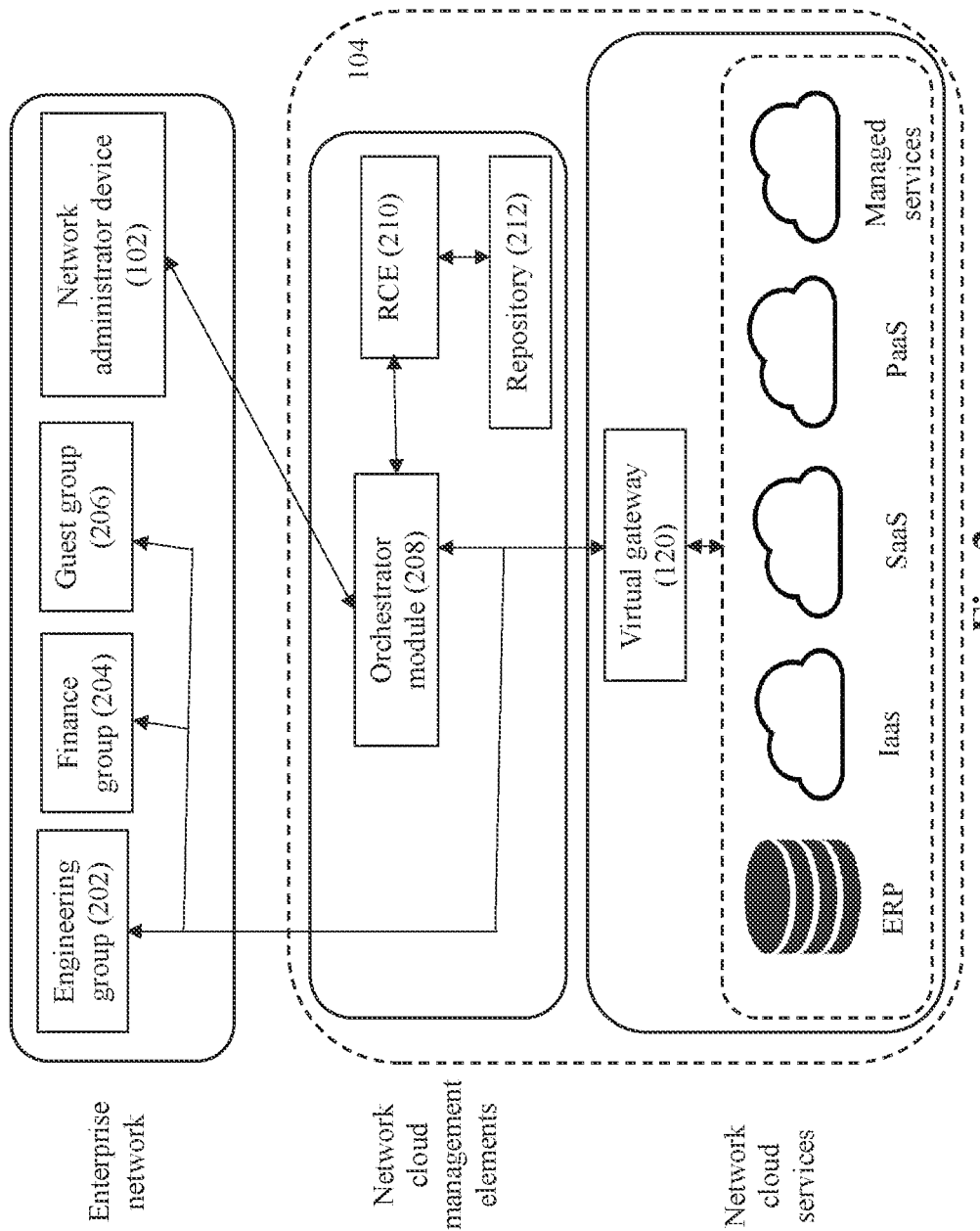
FIG. 2 illustrates detailed implementation of a cloud management model, in accordance with an embodiment of the present disclosure.

FIG. 2 illustrates detailed implementation of a cloud management model, in accordance with an embodiment of the present disclosure. For licensing a service set to support functions of different user groups present in an enterprise network, such as an engineering group 202, finance group 204, and a guest group 206, the network administrator may communicate with an orchestrator module 208 configured over the network cloud 104. Along with the orchestrator module 208, a. Resource Compute Element (RCE) 210 and a repository 212 may also be present over the network cloud 104. From the orchestrator module 208, the RCE 210 may receive attributes belonging to the user groups 202 through 206, provided by the network administrator. Based on the attributes, the RCE 210 may first determine hardware capabilities and network capabilities corresponding to the attributes by querying the repository 212, and thereupon may determine a service set capable of providing the hardware capabilities and the network capabilities by querying the repository 212 again. Once information of the service set is provided to the orchestrator module 208, the orchestrator module 208 may request configuration of the service set over the network cloud 104, through the virtual gateway 120. The service set may include one or more of several network cloud based services provided by the network cloud 104, such as Infrastructure as a Service (IaaS), Platform as a Service (PaaS), Software as a Service (SaaS), Enterprise Resource Planning (ERP), and managed services.

Figure 3:
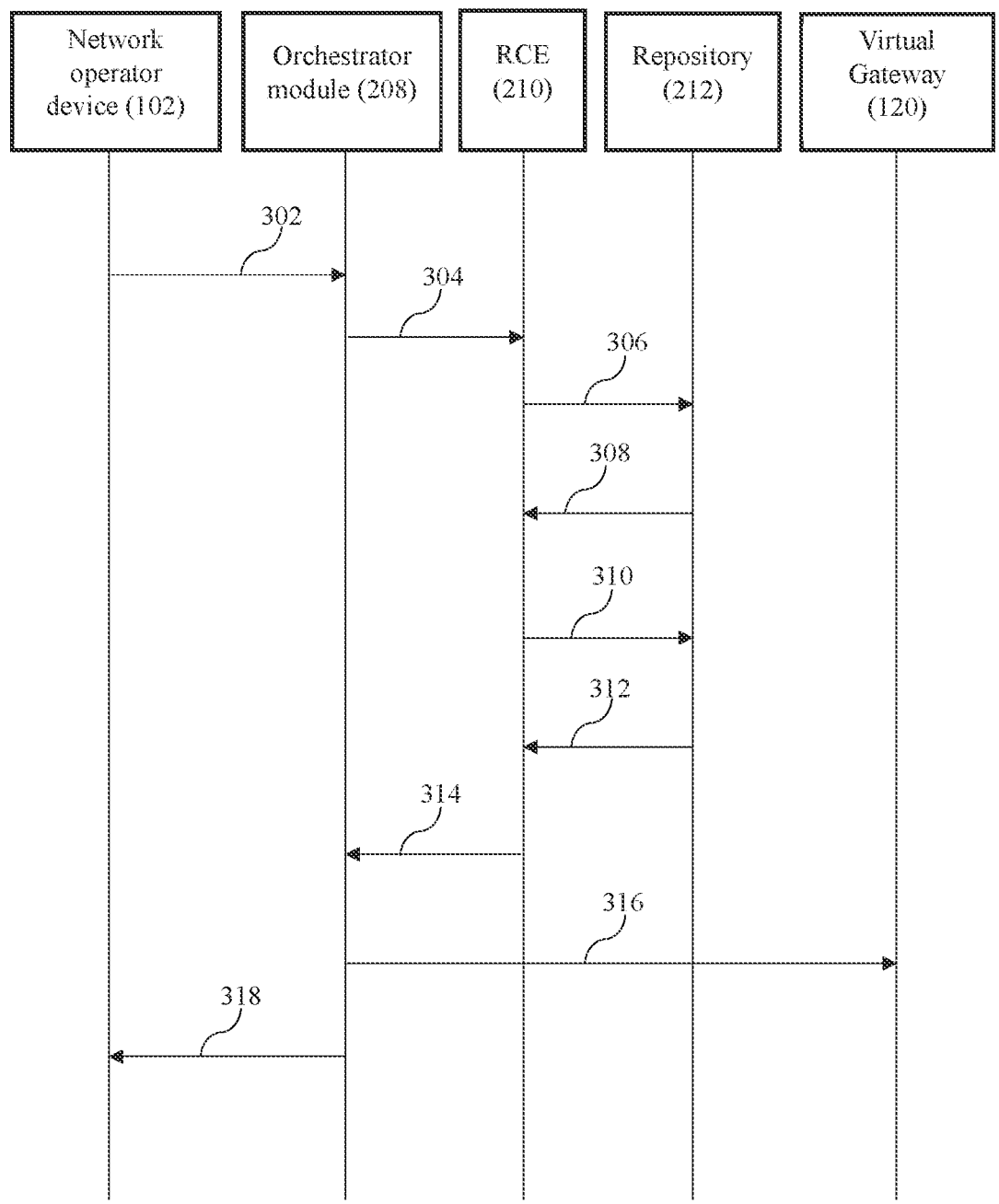
FIG. 3 illustrates a data flow diagram showing information exchange for configuration of resources over a network cloud, in accordance with an embodiment of the present disclosure.

FIG. 3 illustrates a data flow diagram showing information exchange for configuring resources over the network cloud 104, in accordance with an embodiment of the present disclosure. At instance 302, using the network administrator device 102, the network administrator may send a request to the orchestrator module 208 for configuring resources on the network cloud 104. Such resources may require to be configured to serve hardware and network requirements of users operating their user devices within the organization. The network administrator may be a person responsible for managing licenses or subscription of services purchased over the network cloud 104. The network administrator may submit the request into a User Interface (UI) provided by the orchestrator module 208. It must be understood that different types of UIs may be used for receiving the request from the network administrator. For example, a UI providing a drop down menu, a UI allowing selection of an input from a list of predefined inputs, or a UI allowing to manually enter the request may be used.

The request may include attributes related to user roles. Specifically, the attributes may include categories of user roles, network cloud based services, and a number of users associated with each category. The network cloud based services may correspond to hardware and/or software services hosted over a network cloud 104. Additionally, other attributes such as type of encryption, manner of authentication of users' requests, categories for classification of data, bandwidth requirement, throughput requirement, and service up-time may also be provided through the request. In one implementation, the request may be provided as a command of predefined format, such as "ENG_ROLE_DOT1X_AES_5GBPS_1000." Such input indicates multiple attributes including roles of users as Engineering (ENG_ROLE), authentication type as WPA2-Enterprise (DOT1X), encryption scheme as Advanced Encryption Scheme (AES), bandwidth as 5GBPS, and user count as 1000.

At instance 304, the orchestrator module 208 may forward the attributes to the RCE 210. The RCE 210 may determine hardware capabilities and network capabilities corresponding to the attributes. The hardware capabilities may comprise amount of processing power required and memory requirements, such as of HDD or SSD, and RAM. The network capabilities may comprise bandwidth, latency, and throughput. The RCE 210 may determine the hardware capabilities and the network capabilities from data stored in the repository 212, by submitting a query at instance 306 and receiving response towards the query at instance 308. The data stored in the repository 212 corresponds to learning gathered from previous implementations and instructions associated with the service sets, released by agency managing the network cloud 104. Further, such data may be stored in one of several suitable formats, such as a Look Up Table (LUT) and a decision tree. In a decision tree, data may be stored in root and the intermediate nodes corresponding to the attributes and leaf nodes corresponding to the hardware capabilities and the network capabilities.

FIG. 4 illustrates requirements determined by the RCE 210 for different network configuration requests. For the request "NG_ROLE_DOT1X_AES_5GBPS_1000", the RCE determines that 4 Central Processing Units (CPUs) and 6 GB of Random Access Memory (RAM) would be required. For another request "ENG_ROLE_DOT1X_AES_10GBPS_1000", the RCE 210 determines that 6 Central Processing Units (CPUs) and 16 GB of Random Access Memory (RAM) would be required. For yet another request "GUEST_ROLE_OPEN_10GBPS_1000", the RCE 210 determines that 5 Central Processing Units (CPUs) and 8 GB of Random Access Memory (RAM) would be required. Although in current examples, the network capabilities i.e. the bandwidth are mentioned to be received within the request, it is quite possible that the network capabilities are not provided within the request, and the RCE 210 determines it from other received attributes, such as the user roles. For example, the RCE 210 may determine that for 1000 Engineering (ENG_ROLE) users, 5 Gbps bandwidth would be sufficient, and for 1000 Guest (GUEST_ROLE) users, 1 Gbps bandwidth would be sufficient.

Successive to determining the hardware capabilities and the network capabilities, the RCE 210 may determine an appropriate service set capable of providing the hardware capabilities and the network capabilities. The service set could be understood as a service package/module or Stock-Keeping Unit (SKU) designed by network cloud service providers for licensing to organizations. The RCE 210 may determine the suitable service set from data stored in the repository 212, by submitting a query at instance 310 and receiving response towards the query at instance 312. For example, the data stored in the repository 212 may be present as a LUT, as illustrated below.

| S. No. | Service set | User support count | Total vCPU (hyperthreaded) | Memory (GB) | Flash/Disk (GB) |
| --- | --- | --- | --- | --- | --- |
| 1 | MC-VA-10 | 256 | 3 | 4 | 6 |
| 2 | MC-VA-50 | 800 | 4 | 6 | 6 |
| 3 | MC-VA-250 | 4000 | 5 | 8 | 8 |
| 4 | MC-VA-1K | 16000 | 6 | 16 | 16 |
| 5 | MC-VA-4K | 65496 | 12 | 48 | 48 |
| 6 | MC-VA-6K | 63977 | 14 | 64 | 64 |

In one instance, while the RCE 210 queries the repository 212 for determining a service providing 5 virtual Central Processing Units (CPUs), 8 GB memory, and 8 GB of flash memory as the hardware capabilities, MC-VA-250 may be identified as the suitable service set. Further, from the data, a number of users supported by the service set may also be determined. For example, the number of users supported by the service set MC-VA-250 may be identified as 4000. Although the data used for determining the service set is illustrated as a LUT, it is fairly possible to store the data in other formats, such as a decision tree comprising root and intermediate nodes corresponding to the hardware capabilities and leaf node representing the service sets.

At instance 314, the RCE 210 may communicate details of an identified service set to the orchestrator module 208. At instance 316, the orchestrator module 208 may send details of the identified service set to the Virtual Gateway 120 for configuring the resources over the network cloud 104 to implement the service set for use by the users of the organization. Configuring the resources over the network cloud 104 means reserving and customizing the resources for implementing the service set, and thereby making required services accessible by the users. Thus, the orchestrator module 208 gets the service set implemented through the Virtual Gateway 120. Post getting the service set configured over the network cloud 104, the orchestrator module 208 may send a confirmation message to notify the network administrator, at instance 318. Further, in certain implementations, immediately before configuring the service set over the network cloud 104, the network administrator may be required to make payment towards purchasing/licensing the service set. Upon making such payment, credentials for accessing the service set may be shared with the network administrator.

Later, when categories of the user roles change or the number of users associated with each category of role change, the service set already configured for the users may be reconfigured or a new service set may be determined using the above described process. Such new service set may be determined and configured by accessing the UI provided by the orchestrator module 208. This enables dynamic update of the service set, during change in requirements of an enterprise.

Implementing the methodologies explained above, current disclosure allows dynamic orchestration of virtual gateways i.e. configuring a service set over a network cloud based on the optimal compute (hardware capabilities and network capabilities) determined for a group of users or an organization. Specifically, the dynamic orchestration of virtual gateways over network cloud is performed based on roles of the users and a number of the users associated with each role. The disclosure also allows dynamic re-orchestration of virtual gateways during changes in the number of users and/or change of user roles. In this manner, under-utilization of a service set or over-purchase of a service set is avoided.

Figure 5:
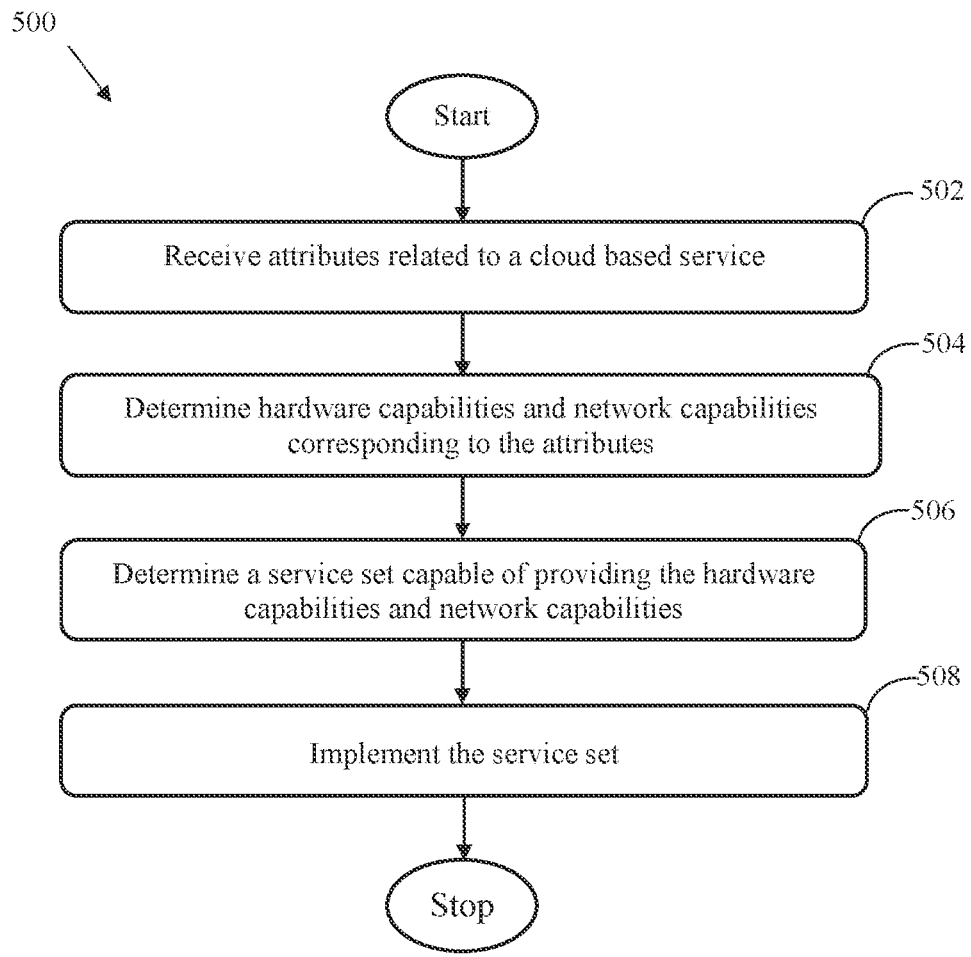
FIG. 5 illustrates a flowchart showing a method for configuring resources over a network cloud, in accordance with an embodiment of the present disclosure.

Referring now to FIG. 5, method for configuring resources over a network cloud for serving users' requirements is described with reference to the flowchart 500. In this regard, each block may represent a module, segment, or portion of code, which comprises one or more executable instructions for implementing the specified logical function(s). It should also be noted that in some alternative implementations, the functions noted in the blocks may occur out of the order noted in the drawings. For example, two blocks shown in succession in FIG. 5 may in fact be executed substantially concurrently or the blocks may sometimes be executed in the reverse order, depending upon the functionality involved. Any process descriptions or blocks in flow charts should be understood as representing modules, segments, or portions of code which include one or more executable instructions for implementing specific logical functions or steps in the process, and alternate implementations are included within the scope of the example embodiments in which functions may be executed out of order from that shown or discussed, including substantially concurrently or in reverse order, depending on the functionality involved. In addition, the process descriptions or blocks in flow charts should be understood as representing decisions made by a hardware structure such as a state machine.

At block 502, attributes related to a user roles may be obtained from a network administrator responsible for managing network of an enterprise. The attributes may include categories of user roles, network cloud based service associated with each category, and a number of users associated with each category. The network cloud based services correspond to hardware and/or software services hosted over a network cloud.

At block 504, hardware capabilities and network capabilities corresponding to the attributes may be determined, from a mapping table stored in a repository. The hardware capabilities comprise processing power and memory requirements. The network capabilities comprise bandwidth, latency, and throughput requirements.

At block 506, a service set capable of providing the hardware capabilities and the network capabilities may be determined from the mapping table stored in the repository. The service set could be understood as a service package/module or Stock-Keeping Unit (SKU) designed by network cloud service providers for licensing to organizations.

At block 508, suitable resources may be configured over the network cloud to implement the service set, for serving users' requirements. The service set may also be reconfigured, based on changes in the attributes.

An embodiment of the disclosure may be an article of manufacture in which a machine-readable medium (such as microelectronic memory) has stored thereon instructions which program one or more data processing components (generically referred to here as a "processor") to perform the operations described above. In other embodiments, some of these operations might be performed by specific hardware components that contain hardwired logic (e.g., dedicated digital filter blocks and state machines). Those operations might alternatively be performed by any combination of programmed data processing components and fixed hardwired circuit components.

The detailed description set forth below in connection with the appended drawings is intended as a description of various embodiments of the present disclosure and is not intended to represent the only embodiments in which details of the present disclosure may be implemented. Each embodiment described in this disclosure is provided merely as an example or illustration, and should not necessarily be construed as preferred or advantageous over other embodiments.

Any combination of the above features and functionalities may be used in accordance with one or more embodiments. In the foregoing specification, embodiments have been described with reference to numerous specific details that may vary from implementation to implementation. The specification and drawings are, accordingly, to be regarded in an illustrative rather than a restrictive sense. The sole and exclusive indicator of the scope of the disclosure, and what is intended by the applicants to be the scope of the disclosure, is the literal and equivalent scope of the set as claimed in claims that issue from this application, in the specific form in which such claims issue, including any subsequent correction.

A network cloud may be implemented using multiple Data centres that can support the distributed computing environment. The data centres include a cloud computing platform, racks, and nodes (e.g., computing devices, processing units, or blades) in each rack. The virtual gateway can be implemented with a cloud computing platform that runs cloud services across different data centres and geographic regions. The cloud computing platform can implement an allocator component for provisioning and managing resource allocation, deployment, upgrade, and management of cloud services. Typically, the cloud computing platform acts to store data or run service applications in a distributed manner. The cloud computing platform may be a public cloud, a private cloud, or a dedicated cloud.

A non-transitory computer-readable storage medium includes program instructions to implement various operations embodied by a computing device such as a laptop, desktop, or a server. The medium may also include, alone or in combination with the program instructions, data files, data structures, and the like. The medium and program instructions may be those specially designed and constructed for the purposes, or they may be of the kind well-known and available to those having skill in the computer software arts. Examples of non-transitory computer-readable storage medium include magnetic media such as hard disks, floppy disks, and magnetic tape; optical media such as Compact Disc Read-Only Memory (CD-ROM) disks and Digital Video Disc (DVD); magneto-optical media such as floptical disks; and hardware devices that are especially to store and perform program instructions, such as Read Only Memory (ROM), Random Access Memory (RAM), flash memory, and the like. Examples of program instructions include both machine code, such as produced by a compiler, and files containing higher level code that may be executed by the computer using an interpreter. The described hardware devices may be to act as one or more software modules in order to perform the operations of the above-described embodiments.

Modules as used herein, such as the communication module and the orchestration module are intended to encompass any collection or set of program instructions executable over network cloud so as to perform requited task by the software. The term "software" as used herein is intended to encompass such instructions stored in storage medium such as RAM, a hard disk, optical disk, or so forth, and is also intended to encompass so-called "firmware" that is software stored on a ROM or so forth. Such software may be organized in various ways, and may include software components organized as libraries, Internet-based programs stored on a remote server or so forth, source code, interpretive code, object code, directly executable code, and so forth. It is contemplated that the software may invoke system-level code or calls to other software residing on server or other location to perform certain functions.

A processor may include one or more general purpose processors (e.g., INTEL® or Advanced Micro Devices® (AMD) microprocessors) and/or one or more special purpose processors (e.g., digital signal processors or Xilinx® System On Chip (SOC) Field Programmable Gate Array (FPGA) processor), MIPS/ARM-class processor, a microprocessor, a Digital Signal Processor (DSP), an Application Specific Integrated Circuit (ASIC), a microcontroller, a state machine, or any type of programmable logic array.

A memory may include, but is no limited to, non-transitory machine-readable storage devices such as hard drives, magnetic tape, floppy diskettes, optical disks. Compact Disc Read-Only Memories (CD-ROMs), and magneto-optical disks, semiconductor memories, such as ROMs, Random Access Memories (RAMS), Programmable Read-Only Memories (PROMs), Erasable PROMs (EPROMs), Electrically Erasable PROMs (EEPROMs), flash memory, magnetic or optical cards, or other type of media/machine-readable medium suitable for storing electronic instructions.

The terms "or" and "and/or" as used herein are to be interpreted as inclusive or meaning any one or any combination, Therefore, "A, B or C" or "A, B and/or C" mean "any of the following: A; B; C; A and B; A and C; B and C; A, B and C." An exception to this definition will occur only when a combination of elements, functions, steps or acts are in some way inherently mutually exclusive,

We claim:

1. A method comprising:
receiving, at a user interface executing on one or more processors, attributes related to user roles, wherein:
the attributes include categories of user roles, network cloud based services associated with each category, and a number of users associated with each category, and
the network cloud based services correspond to one or more of hardware and software services hosted over a network cloud;
determining, by a resource compute element (RCE) executing on the one or more processors and from a mapping table stored in a repository, one or more of hardware capabilities and network capabilities based on the attributes;
determining, by the RCE, a service set capable of providing one or more of the hardware capabilities and the network capabilities from the mapping table stored in the repository, wherein the mapping table is based on at least one of previous implementations and instructions associated with one or more service sets; and
configuring, by one or more virtual gateways executing on the one or more processors, resources over the network cloud to implement the service set.

2. The method of claim 1, wherein the hardware capabilities comprise processing power and memory.

3. The method of claim 1, wherein the network capabilities comprise bandwidth, latency, and throughput.

4. The method of claim 1, wherein the receiving of the attributes and the determining of the one or more of hardware capabilities and the network capabilities and the determining of the service set are performed by an orchestration module implemented over the network cloud and comprising the user interface.

5. The method of claim 1, wherein the one or more virtual gateways are present in the network cloud.

6. The method of claim 1, wherein the attributes further include manner of authentication of users' requests for accessing the network cloud based services.

7. The method of claim 1, wherein the attributes further include type of encryption of data exchanged by the users while accessing the network cloud based services.

8. The method of claim 1, wherein the attributes further include categories for classification of data accessed by the users while using the network cloud based services.

9. The method of claim 1, further comprising reconfiguring the service set based on change in one or more of the categories or the number of users associated with each category.

10. A system for configuring resources over a network cloud, the system comprising:
a plurality of processors; a plurality of memory storing program instructions which, when executed by plurality of processors, causes one or more processors of the plurality of processors to:
receive attributes related to user roles, wherein:
the attributes include categories of user roles, network cloud based services associated with each category, and a number of users associated with each category, and
the network cloud based services correspond to one or more of hardware and software services hosted over the network cloud;
determine, from a mapping table stored in a repository, one or more of hardware capabilities and network capabilities based on the attributes;
determine a service set capable of providing one or more of the hardware capabilities and the network capabilities from the mapping table stored in the repository, wherein the mapping table is based on at least one of previous implementations and instructions associated with one or more service sets; and
configure resources over the network cloud to implement the service set.

11. The system of claim 10, wherein the hardware capabilities comprise processing power and memory.

12. The system of claim 10, wherein the network capabilities comprise bandwidth, latency, and throughput.

13. The system of claim 10, wherein an orchestration module implemented over the network cloud receives the attributes, determines the one or more of hardware capabilities and the network capabilities, and determines of the service set.

14. The system of claim 10, wherein the network cloud hosts one or more virtual gateways to configure the resources over the network cloud to implement the service set.

15. The system of claim 10, wherein the attributes further include manner of authentication of users' requests for accessing the network cloud based services.

16. The system of claim 10, wherein the attributes further include type of encryption of data exchanged by the users while accessing the network cloud based services.

17. The system of claim 10, wherein the attributes further include categories for classification of data accessed by the users while using the network cloud based services.

18. The system of claim 10, further comprising reconfiguring the service set based on change in one or more of the categories or the number of users associated with each category.

19. A non-transitory computer-readable storage medium comprising machine readable instructions, that when executed, cause one or more processors to:

receive attributes related to user roles, wherein:
- the attributes include categories of user roles, network cloud based services associated with each category, and a number of users associated with each category, and
- the network cloud based services correspond to one or more of hardware and software services hosted over a network cloud;

determine one or more of hardware capabilities and network capabilities based on the attributes, from a mapping table stored in a repository;

determine a service set capable of providing the hardware capabilities and one or more of the network capabilities from the mapping table stored in the repository, wherein the mapping table is based on at least one of previous implementations and instructions associated with one or more service sets; and configure resources over the network cloud to implement the service set.

20. The non-transitory computer-readable storage medium of claim 19, wherein the hardware capabilities comprise processing power and memory, and the network capabilities comprise bandwidth, latency, and throughput.

\* \* \* \* \*